United States Patent
Garcia et al.

(10) Patent No.: US 12,285,095 B2
(45) Date of Patent: Apr. 29, 2025

(54) COSMETIC SWAB

(71) Applicants: Alejandra Garcia, Austin, TX (US);
Matthew Justman, Austin, TX (US)

(72) Inventors: Alejandra Garcia, Austin, TX (US);
Matthew Justman, Austin, TX (US)

( * ) Notice: Subject to any disclaimer, the term of this patent is extended or adjusted under 35 U.S.C. 154(b) by 713 days.

(21) Appl. No.: 16/937,452

(22) Filed: Jul. 23, 2020

(65) Prior Publication Data

US 2021/0022476 A1 Jan. 28, 2021

Related U.S. Application Data

(60) Provisional application No. 62/877,578, filed on Jul. 23, 2019.

(51) Int. Cl.
*A45D 34/04* (2006.01)
*B32B 5/24* (2006.01)
(Continued)

(52) U.S. Cl.
CPC .............. *A45D 34/04* (2013.01); *B32B 5/245* (2013.01); *B32B 5/26* (2013.01); *B32B 7/09* (2019.01);
(Continued)

(58) Field of Classification Search
CPC ............ A45D 34/04; A45D 2200/1018; A45D 2200/1063; B32B 5/245; B32B 5/26;
(Continued)

(56) References Cited

U.S. PATENT DOCUMENTS 6,629,329 B1 10/2003 Webb et al.
2005/0069672 A1 3/2005 Katsin
(Continued)

FOREIGN PATENT DOCUMENTS

EP 0402140 B1 2/1996
GB 2445541 A 7/2008
(Continued)

OTHER PUBLICATIONS

Harmony Business Supplies, "Tekniswab Elongated Tip Microfiber Swab, 6 in., Polypropylene Shaft, 100/bag," <https://harmonycr.com/swabs-applicators/tekniswab-elongated-tip-microfiber-swab-6-polypropylene-shaft-100-bag/tsmw6> web page accessed Jul. 4, 2019.

(Continued)

*Primary Examiner* — Brian Handville
(74) *Attorney, Agent, or Firm* — Michael Best & Friedrich LLP

(57) ABSTRACT

A cosmetic swab including a handle including an elongated body having a length extending between a first end and a second end, where the elongated body defines a grip portion disposed between the first end and the second end. The grip portion has a width that is less than the length of the elongated body, where the width is measured in a direction perpendicular to the length. A head is disposed on the first end of the handle, where the head has a width that is greater than the width of the handle. A first fabric layer surrounds the head, where the first fabric layer is form-fitted to the head to limit shifting of the first fabric layer relative to the head. A second fabric layer overlays the first fabric layer, where the second fabric layer is a non-cotton textile, and where the second fabric layer is coupled to the handle along a seam extending continuously around a perimeter of handle.

18 Claims, 7 Drawing Sheets

(51) Int. Cl.
    *B32B 5/26*         (2006.01)
    *B32B 7/09*         (2019.01)

(52) U.S. Cl.
    CPC ............... *A45D 2200/1018* (2013.01); *A45D 2200/1063* (2013.01); *B32B 2307/728* (2013.01); *B32B 2555/00* (2013.01)

(58) Field of Classification Search
    CPC . B32B 7/09; B32B 2307/728; B32B 2555/00; B32B 2250/03; B32B 1/00; B32B 2250/20; B32B 2262/0269; B32B 2262/0276; B32B 2262/04; B32B 2262/14; B32B 2307/73; B32B 3/04; B32B 5/024; B32B 5/026; B32B 5/18; B32B 2262/0246; B32B 2262/0261
    See application file for complete search history.

(56) References Cited

U.S. PATENT DOCUMENTS

| | | |
|---|---|---|
| 2005/0267395 A1 | 12/2005 | Mangold et al. |
| 2014/0237748 A1 | 8/2014 | Sweeney |
| 2016/0015153 A1 | 1/2016 | Vidotto et al. |
| 2016/0257470 A1* | 9/2016 | Casey .................. A45D 34/042 |

FOREIGN PATENT DOCUMENTS

| | | |
|---|---|---|
| JP | 2005330637 A | 12/2005 |
| JP | 2010000410 A | 1/2010 |

OTHER PUBLICATIONS

Foamtec International WCC, "MiraSwab / Microfiber Swab," <https://www.foamtecintlwcc.com/products/swabs/miraswab> web page accessed Jul. 4, 2019.

Puritan Medical Products, "PurSwab 6" Paddle Shaped Microfiber Swab w/Polypropylene Handle, <https://www.puritanmedproducts.com/3677.html> web page accessed Jul. 4, 2019.

* cited by examiner

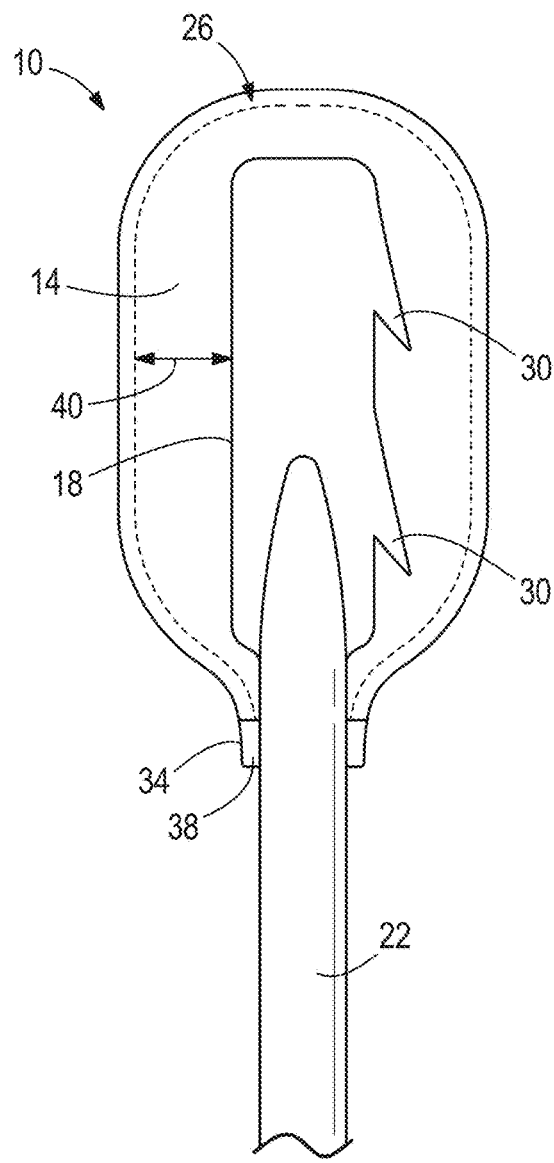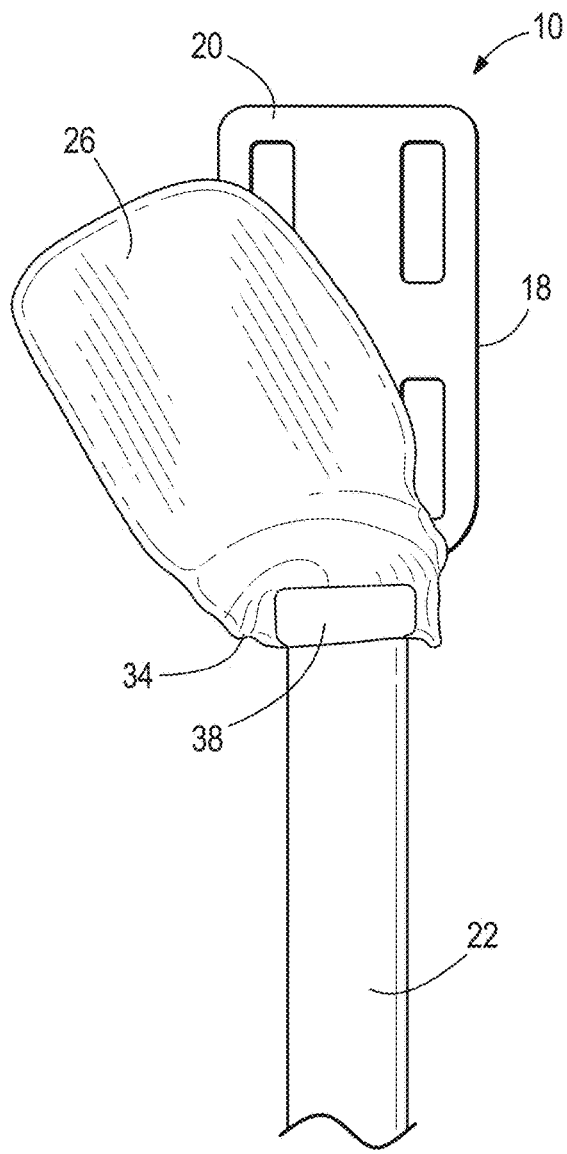
FIG. 2
PRIOR ART
FIG. 3
PRIOR ART

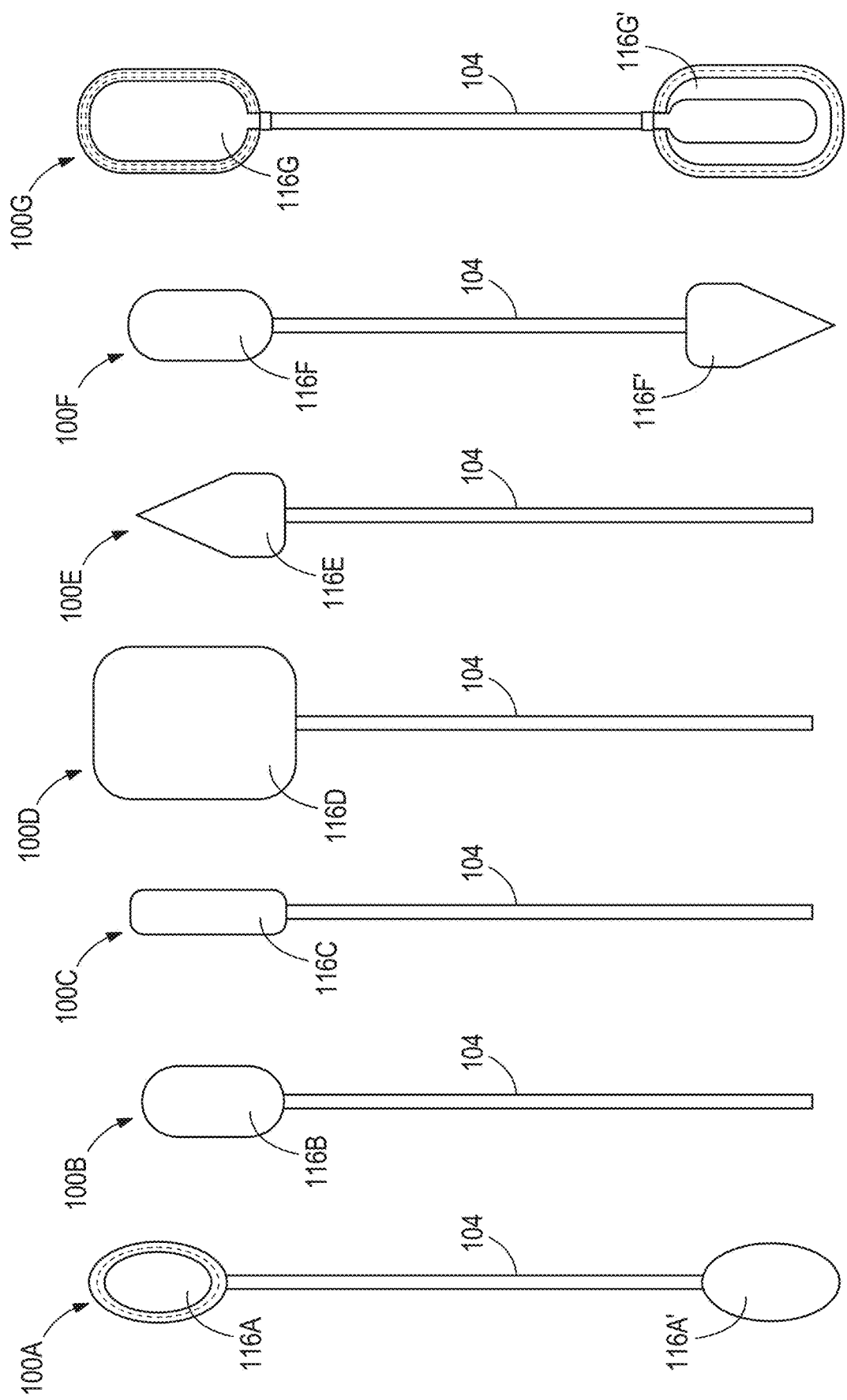

COSMETIC SWAB

CROSS-REFERENCE TO RELATED APPLICATIONS

The present application claims priority to U.S. Provisional Application No. 62/877,578, filed Jul. 23, 2019, the entire contents of which is incorporated by reference herein.

TECHNICAL FIELD

The present disclosure relates generally to cosmetic products and toilet articles and more particularly to a toilet article intended to be used as an 1) eye make-up remover, or 2) eye skincare (serum, cream, etc.) applicator.

BACKGROUND

The eye and skin surrounding the eye is one of the areas of the face most prone to signs of aging. Therefore, the eye area needs very delicate care to prevent premature aging, while also preventing and reducing irritation of sensitive skin. The current market lacks eye cosmetic swabs targeting the removal of eye makeup using premium materials such as microfiber and other non-cotton-based textiles. Additionally, the current market lacks cosmetic swabs targeting the application of skincare to the eye area (i.e. facial moisturizers and serums), whose purpose is to gently apply these products to the eye area while minimizing waste that would be lost to absorption in cotton. Previous solutions are inadequate in part because most eye swabs are cotton based, which can lead to many problems.

The eye area of the face (i.e., the eye and surrounding skin) is one of the areas of the face most prone to signs of aging. Therefore, the eye area needs very delicate care to prevent premature aging, while also preventing and reducing irritation of sensitive skin. The current market lacks eye cosmetic swabs targeting the removal of eye makeup using premium materials such as microfiber and other non-cotton-based textiles. Additionally, the current market lacks swabs targeting the application of skincare to the eye area (i.e. facial moisturizers and serums), whose purpose is to gently apply these products to the eye area while minimizing waste that would be lost to absorption in cotton.

With reference to FIGS. 1-4, existing swabs 10 that are available on the market present various problems that make them inadequate or even harmful to the eye area. Currently available cosmetic swabs 10 are inadequate, in part, because most eye swabs 10 are cotton-based, which can lead to several issues. For example, many existing swabs 10 with a cotton applicator can result in harsh removal of makeup, which may irritate the skin or may cause premature aging. Cotton-based swabs 10 often absorb too much product and may waste expensive skincare products. Additionally, cotton fibers may flake off and get into the eye, which can cause either the cotton fiber or the cosmetic liquid solution to directly contact with the eyeball. Accordingly, one aspect of the present disclosure provides a cosmetic swab 10 that utilizes a premium fabric cover 26 or a non-cotton based fabric cover 26 that is gentle on the eye area.

Premium fabric swabs 10 are sometimes used in the electronic world to clean and maintain delicate electronic components. However, as described in further detail below, the swabs 10 used in the electronic world are inadequate for use as a cosmetic swab 10 or for use around the eye area. Also, swabs 10 used for cleaning electronic components are typically manufactured in a medical grade facility, which increases manufacturing costs. Therefore, one aspect of the present disclosure provides methods of adapting premium swabs 10 used in the electronics world for use in the beauty sector, and particularly for use in the application and removal of cosmetics such as eye-makeup.

Many of the existing swabs 10 have edges 18 that make them unsuitable for use around the eye area. For example, may existing swabs 10 include rigid edges 18 or rough edges 18 along the base 22 of the swab 10 to help grip a fabric cover 26. For example, in FIG. 1A, the edges 18 of the base 22 are rough. Likewise, in FIG. 2, the edges 18 of the base 22 have rigid teeth 30 to help grip a fabric cover 26. These rough surfaces and ridges can be hazardous to the eye area, may irritate sensitive skin, or may cause abrasions to the skin. Furthermore, many existing swabs 10 only include a single layer of fabric on the applicator 14, which does not provide much cushion against a user's face. Accordingly, one aspect of the present disclosure provides a cosmetic swab 10 that includes smooth surfaces and rounded edges 18. Additionally, the present disclosure provides a cosmetic swab that provides sufficient cushion to be gentle on a user's face.

Referring to FIG. 3, many of the existing swabs 10 available in the electronics world include fabric cover 26 that is adhered to the base 22 of the swab 10 in an uneven or discontinuous manner, causing rough free edges 34 along the fabric cover 26 at the adhesion point 38. The rough and discontinuous adhesion point 38 between the fabric cover 26 and the base 22 of the swab 10 may cause injury or abrasion to the skin when the swab 10 is used for cosmetic application or removal. Accordingly, one aspect of the present disclosure provides a cosmetic swab 10 that includes a smooth and continuous adhesion point 38.

As shown in FIGS. 1 and 4, many of the existing swabs 10 available in the electronics market have a loose fabric cover 26 that causes shifting of the microfiber relative to the base 22 when the fabric touches the face. For example, as shown in FIG. 4, the width 44 of the base 22 is significantly smaller than the width 48 of the fabric cover 26, thus creating a gap 40 between the microfiber and the base 22, which results in shifting of the microfiber relative to the handle. This can lead to an imprecise control over the swab 10.

Furthermore, and with general reference to FIGS. 1-4, the swabs 10 currently available on the market are often shaped in a way that makes them ineffective for their purpose. For example, some existing cotton swabs 10 are very rounded or spherical, making it difficult to apply or remove make-up in a precise manner. Other existing swabs 10, such as those shown in FIG. 2, have sharp edges 18 that present a risk of injury or irritation to the eye area. Similarly, some existing swabs 10 have squared corners that are not suitable for use around the eye area. For example, the swabs 10 shown in FIGS. 1A and 3 have squared corners at the tip of the swab, which is the area of the swab 10 that would interact heavily with the face if used as a cosmetic swab 10. Finally, some swabs 10, such as those shown in FIG. 4, are too thin or narrow to properly support a piece of fabric cover 26.

SUMMARY

One aspect of the present disclosure provides a cosmetic swab 10 that has a shape configured to provide precision and control of the cosmetic tool, while also providing a gentle interaction between the cosmetic tool and the face. The present disclosure also provides a cosmetic swab 10 that includes a form-fitted layer of fabric that reduces shifting of the fabric. In one embodiment, the present disclosure provides a cosmetic swab including a handle including an elongated body having a length extending between a first end and a second end, where the elongated body defines a grip portion disposed between the first end and the second end. The grip portion has a width that is less than the length of the elongated body, where the width is measured in a direction perpendicular to the length. A head is disposed on the first end of the handle, where the head has a width that is greater than the width of the handle. A first fabric layer surrounds the head, where the first fabric layer is form-fitted to the head to limit shifting of the first fabric layer relative to the head. A second fabric layer overlays the first fabric layer, where the second fabric layer is a non-cotton textile, and where the second fabric layer is coupled to the handle along a seam extending continuously around a perimeter of handle.

In another embodiment, the present disclosure provides a cosmetic swab includes a handle including an elongated body having a length extending between a first end and a second end, where the elongated body defines a grip portion disposed between the first end and the second end. The grip portion has a width that is less than the length of the elongated body, where the width is measured in a direction perpendicular to the length. A head is disposed on the first end of the handle, where the head has a width that is greater than the width of the handle, and the head includes a pliable core formed of a material that is more pliable than the handle. A fabric layer surrounds the head, where the fabric layer is a non-cotton textile, and where the fabric layer is form-fitted to the head to limit shifting of the fabric layer relative to the head.

In yet another embodiment, the present disclosure provides a method of manufacturing a cosmetic swab. The method includes providing a handle including an elongated body having a length extending between a first end and a second end. The elongated body defines a grip portion disposed between the first end and the second end. The grip portion has a width that is less than the length of the elongated body, where the width is measured in a direction perpendicular to the length. The method further includes forming a head on the first end of the handle, where the head has a width that is greater than the width of the handle, and where the head is formed of a material that is more pliable than the handle. The method further includes wrapping the head with a first fabric layer, where the first fabric layer is form-fitted to the head to limit shifting of the first fabric layer relative to the head. The method further includes overlaying the first fabric layer with a second fabric layer, where the second fabric layer is a non-cotton textile.

Other aspects of the invention will become apparent by consideration of the detailed description and accompanying drawings.

BRIEF DESCRIPTION OF THE DRAWINGS

FIG. 2 illustrates another embodiment of an existing swab.
FIG. 3 illustrates another embodiment of an existing swab.
FIGS. 7A-7G illustrate various embodiments of the invention, including swabs with different heads.

Figure 1:
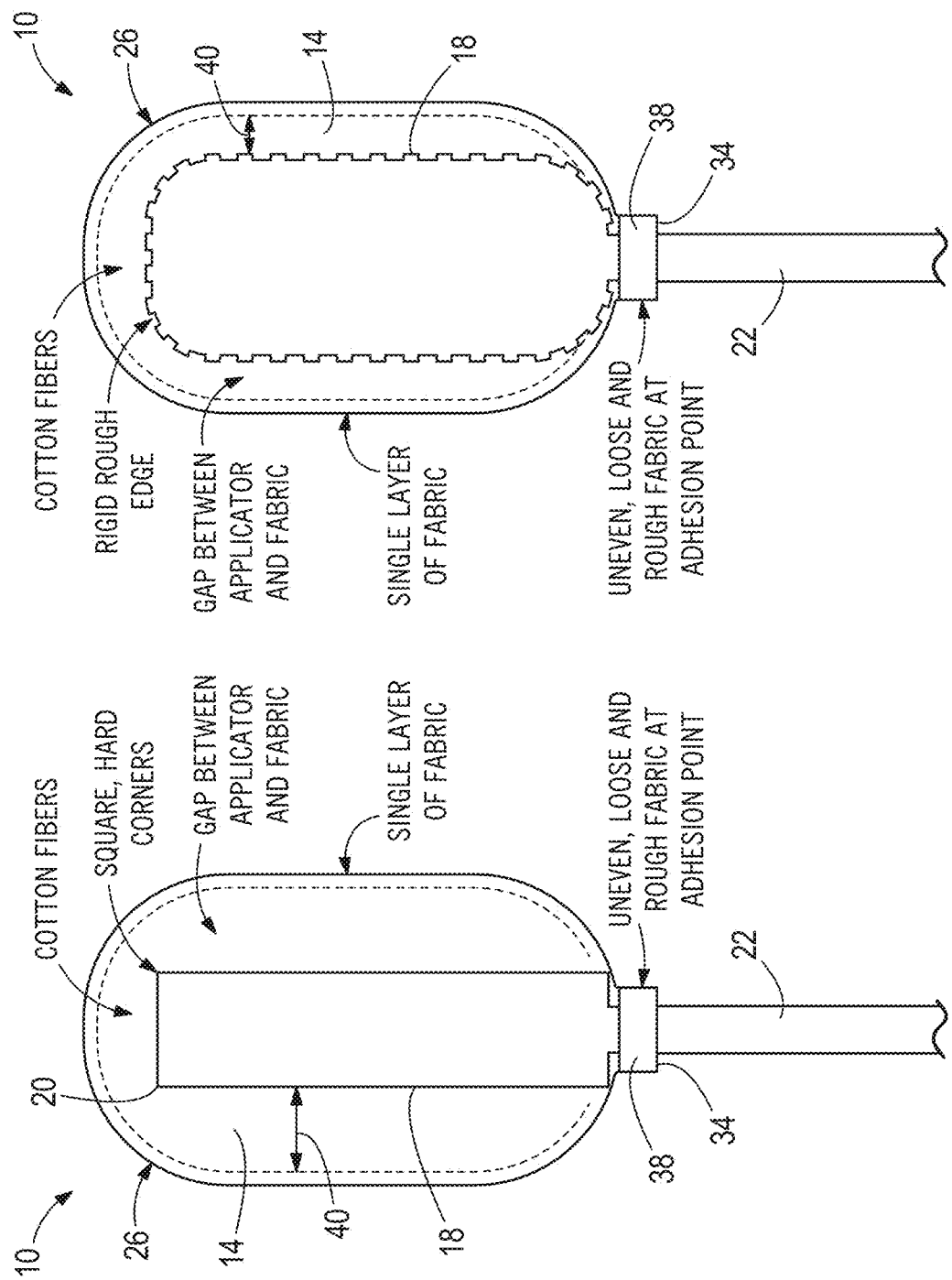
FIG. 1A illustrates one embodiment of an existing swab.
FIG. 1B illustrates another embodiment of an existing swab.
Figure 4:
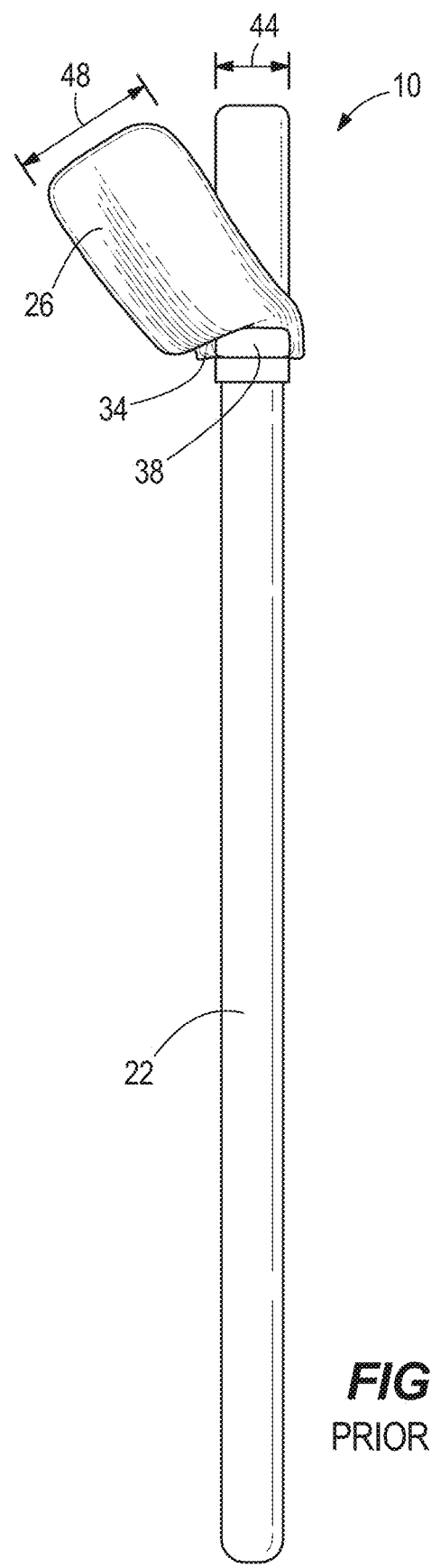
FIG. 4 illustrates another embodiment of an existing swab.
Figure 5A:
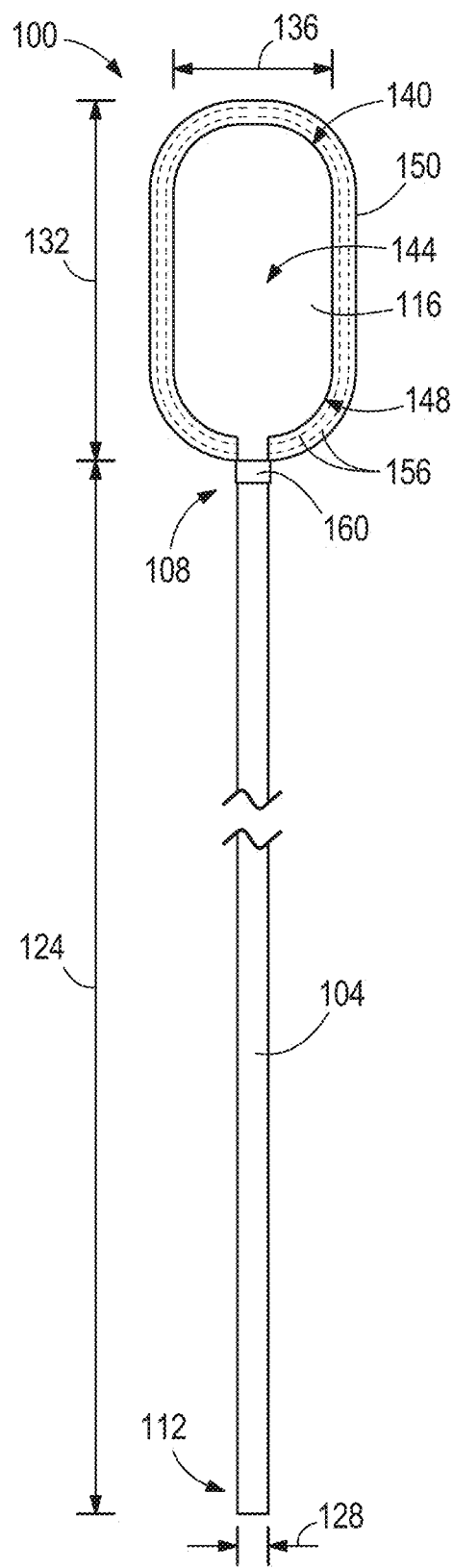
FIG. 5A is a front plan view of a swab according to one embodiment of the invention.
Figure 5B:
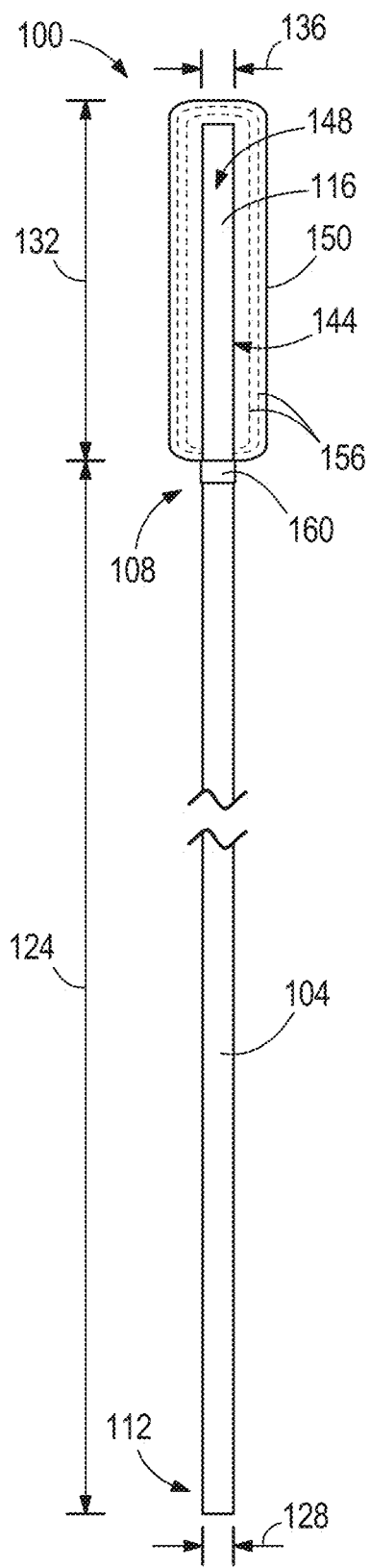
FIG. 5B is a side plan view of the swab according to the embodiment of FIG. 5A.
Figure 6A:
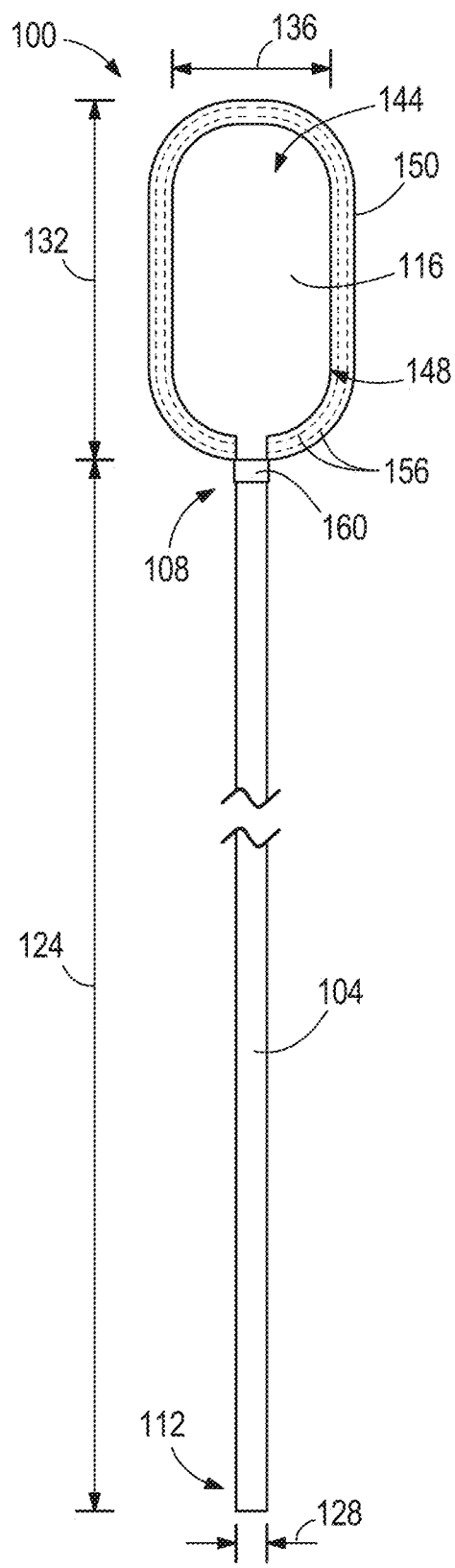
FIG. 6A is a front plan view of a swab according to another embodiment of the invention.
Figure 6B:
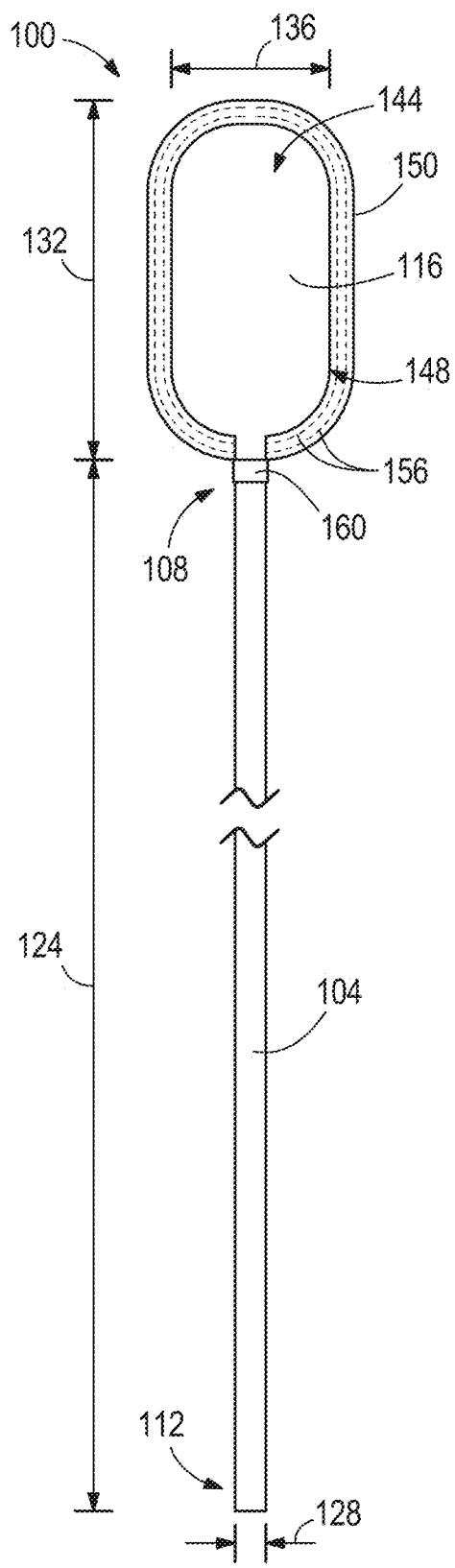
FIG. 6B is a side plan view of the swab according to the embodiment of FIG. 6A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 5-11 provide exemplary embodiments of a cosmetic swab 100 that includes a handle 104 that has an elongated body with a first end 108 and a second end 112, and at least one head 116 positioned on a first end 108 of the handle 104. The handle 104 includes a grip portion 120 disposed between the first end 108 and the second end 112. The handle 104 has a length 124 measured from the first end 108 to the second end 112, and a width 128 measured a direction perpendicular to the direction of the length 124. In some embodiments, the handle 104 has a cylindrical shape with a circular cross-section. In other embodiments, the handle 104 may have different cross-sectional shapes, such as a rectangular shape, a triangular shape, or other cross-sectional shape. The handle 104 may vary in length 124 so that a user can select a desired length 124 best suited for the user's preference. Additionally, the handle 104 may be hollow or may be solid.

The head 116 is positioned on the first end 108 of the handle 104 and has a bulbous shape that extends beyond the width 128 of the handle 104 in at least one direction. More specifically, the head 116 includes a length 132 measured in the same direction as the length 124 of the handle 104, and a width 136 measured perpendicular to the length 132. In the illustrated embodiment, the width 136 of the head 116 is greater than the width 128 of the handle 104 in at least one direction. For example, in the embodiment illustrated in FIGS. 5A and 5B, the width 136 of the head 116 is greater than the width 128 of the handle 104 in a first direction (i.e., shown in FIG. 5A), but is equal to the width 128 of the handle 104 in a second direction (i.e., shown in FIG. 5B). In the embodiment illustrated in FIGS. 6A and 6B, the width 136 of the head 116 is greater than the width 128 of the handle 104 in a first direction (i.e., shown in FIG. 6A) and is greater than the width 128 of the handle 104 in a second direction (i.e., shown in FIG. 6B).

In some embodiments, the head 116 and the handle 104 may be formed as a single unitary body. In other embodiments, the head 116 may be formed as a separate element from the handle 104, and the head 116 may be coupled to the handle 104. For example, the head 116 may be coupled to the handle 104 through a variety of different methods, such as thermal bonding or adhesives.

Figure 8:
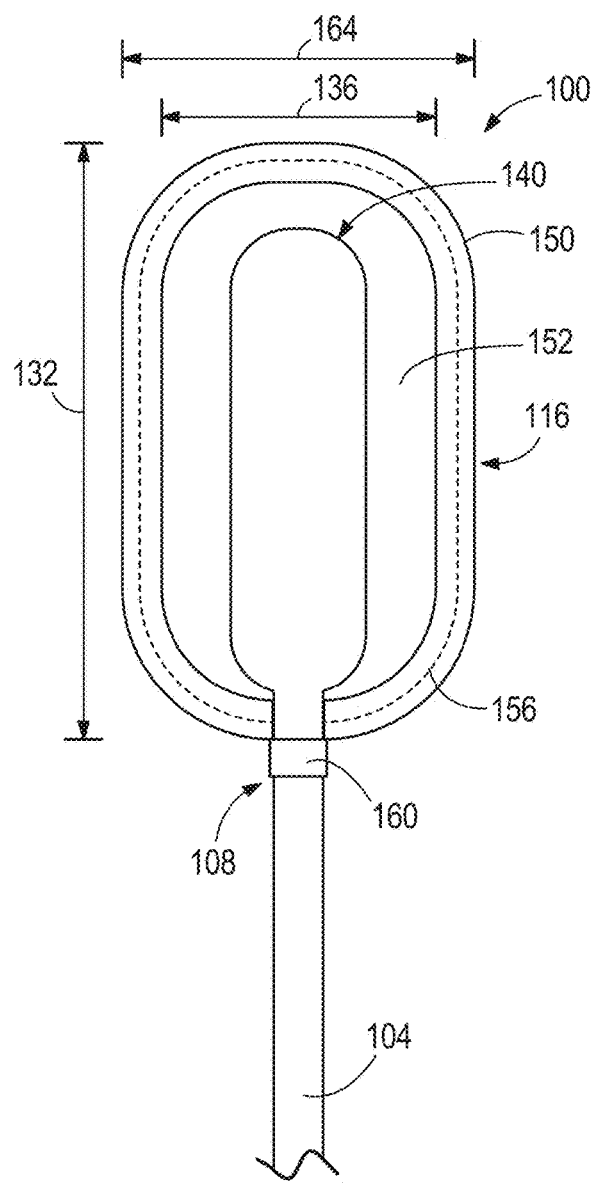
FIG. 8 is a detailed view of a head having a pliable core.

Referring to FIGS. 7A-7G, the head 116 may have a plurality of different shapes and sizes. As shown, the head 116 may vary in shape, width, height, and thickness. For example, the head 116 may be oval, cylindrical, paddle-shaped, precision point, among other shapes. The head 116 includes smooth surfaces and rounded corners that are gentle on a user's face. For example, as shown in FIG. 8, the head 116 may have soft, rounded corners 140, rather than the squared off corners that are often used on the currently available swabs (e.g., compare to swab 10 in FIGS. 1A and 3). Similarly, the head 116 includes smooth surfaces 144 and edges 148, rather than rough edges or rigid teeth (e.g., compare to swab 10 in FIGS. 1B and 2).

Additionally, in some embodiments, the swab 10 may include a second head 116 position on the second end 112 of the handle 104. As shown in FIG. 7A, the second head 116 may be the same size and shape as the head 116 on the first end 108 of the handle 104. In other embodiments, the second head 116 may be a different size, shape or other characteristic than the head 116 positioned on the first end 108 of the handle 104. For example, in the embodiment shown in FIG. 7F, the swab 10 includes a cylindrical head 116 on the first end 108 of the handle 104 and a precision point head 116 on the second end 112 of the handle 104. Similarly, in the embodiment shown in FIG. 7G, the swab 10 includes a first head 116 having a first stiffness and a second head 116 having a second stiffness.

Referring to FIG. 8, in some embodiments, the head 116 includes a pliable core 152. The pliable core 152 provides cushioning and flexibility to the head 116 in order to create a gentle touch against a user's face. The pliable core 152 is composed of a material that is more pliable than the handle 104. In some embodiments, the pliable core 152 is a foam core 152. In other embodiments, the pliable core 152 is composed of a fabric material that provides cushioning or flexibility. In some embodiments, the pliable core 152 makes up only a portion of the head 116. For example, as shown in FIG. 8, the head 116 includes a stiff portion surrounded by a pliable core 152. In other embodiments, the entire head 116 is formed as a pliable core 152.

Figure 9:
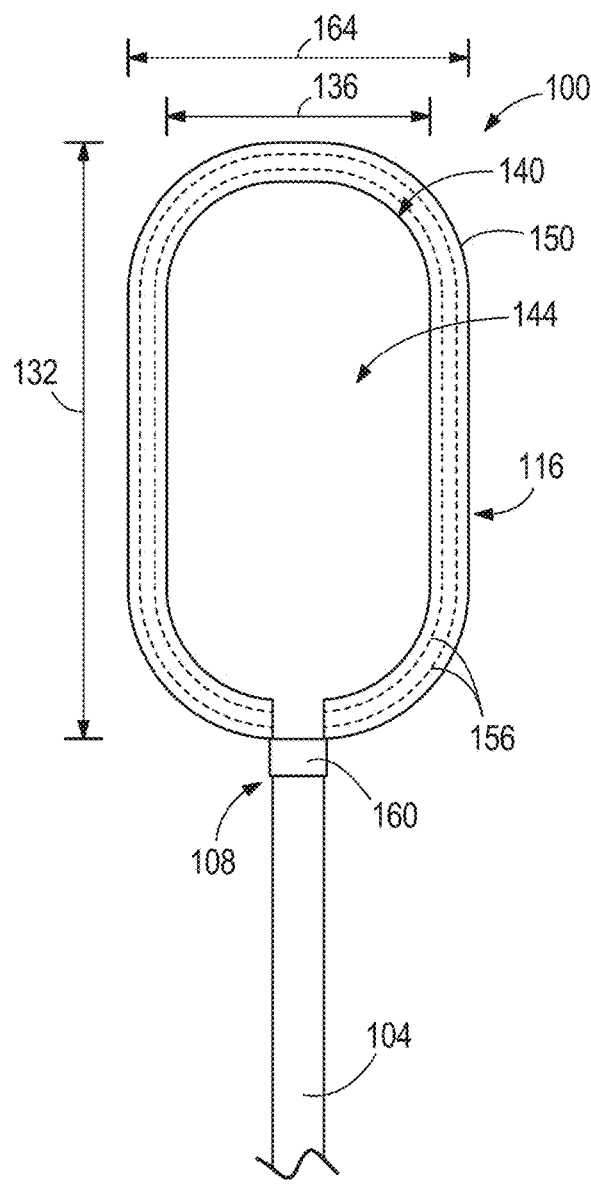
FIG. 9 is a detailed view of a head of a swab according to another embodiment.

Referring to FIG. 9, the swab 10 includes a cover 150 formed of at least one fabric layer 156 surrounding the head 116. In some embodiments, the cover 150 may include a plurality of fabric layers 156 surrounding the head 116 to provide additional cushion between the head 116 of the swab 10 and the user's face. For example, in some embodiments, the cover 150 includes two fabric layers 156, while in other embodiments, the cover 150 includes three or more fabric layers 156. In some embodiments, the plurality of fabric layers 156 are all composed of the same fabric. However, in other embodiments, each fabric layer 156 may have different characteristics. The one or more fabric layer 156 may be coupled to the head 116 or may be coupled to the handle 104. More specifically, the one or more fabric layer 156 may be coupled to the handle 104 along a seam 160. In the illustrated embodiment, the seam 160 extends continuously around the perimeter of the handle 104. The continuous seam 160 limits the number of loose free edges created along the fabric layer 156, which could be abrasive or irritating to a person's face. The seam 160 may create a smooth transition between the fabric layer 156 and the handle 104. It should be understood that in some embodiments, multiple fabric layers 156 are coupled to the handle 104 at along the seam 160.

The cover 150 may be include one or more fabric layer 156 composed of a non-cotton fabric. As described in the Background, most existing cosmetic swabs include cotton-based fabrics, which can be harsh and irritating to the skin, and particularly the sensitive skin in and around the eye area. A non-cotton fabric (e.g., a microfiber), as embodied in the invention described and claimed herein facilitates better removal of make-up with less (or no) skin irritation. Also, cosmetic products are conserved because non-cotton fabrics do not absorb as much of the cosmetic product as cotton-based swabs. Additionally, non-cotton fabrics resist degradation from solvents better than cotton and are therefore more likely to be multi-use.

Thus, the exemplary swabs 10 shown in FIGS. 5-11 may include heads 150 made of one or more non-cotton fabric layer 156. For example, the non-cotton fabric may include, but is not limited to, synthetic fabrics, polyesters, polyamides (e.g., nylon, Kevlar, Nomex, trogamide), rayon, acrylic, or a combination thereof. The fabric may be knit or woven. In some embodiments, the non-cotton fabric may be a flexible fabric capable of stretching around the head 116 of the swab 10. In some embodiments, the non-cotton fabric may be at least partially moisture wicking, water resistant, or water repelling. This would help reduce the absorption of cosmetic products, thereby reducing waste of cosmetic products.

With continued reference to FIG. 9, at least one fabric layer 156 may be form-fit to the head 116. Form-fitting the fabric layer 156 helps reduce shifting of the fabric layer 156 relative to the head 116 when the cover 150 is rubbed along a user's face. In particular, form-fitting the fabric layer 156 may reduce a gap (often found in existing swabs) between the fabric layers 156 of the cover 150 and the head 116. The fabric layer 156 may be form-fit by to the head 116 by forming the fabric layer 156 with a width 164 that is similar to the width 136 of the head 116. Additionally, the fabric layer 156 may be form-fit around the head 116 by stretching the fabric around the head 116. It should be understood that in some embodiments, multiple fabric layers 156 are form-fit around the head 116.

The present invention provides several potential advantages over existing swabs. One aspect of the present disclosure provides a cosmetic swab that utilizes a premium fabric or a non-cotton based fabric that is gentle on the eye area. One aspect of the present invention provides a cosmetic swab that includes smooth surfaces and rounded edges that reduce irritation to the skin. One aspect of the present disclosure provides a cosmetic swab that includes a smooth and continuous adhesion point or seam that reduces irritation to the skin. One aspect of the present disclosure provides a cosmetic swab that includes a form-fitted layer of fabric that reduces shifting of the fabric relative to the base of the swab. One aspect of the present disclosure provides a cosmetic swab that has a shape configured to provide precision and control of the cosmetic tool, while also providing a gentle interaction between the cosmetic tool and the face. One aspect of the present disclosure provides a cosmetic swab that does not have to be manufactured in a medical grade facility.

Although the invention has been described in detail with reference to certain preferred embodiments, variations and modifications exist within the scope and spirit of one or more independent aspects of the invention as described. It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A cosmetic swab comprising:
 a handle including an elongated body having a length extending between a first end and a second end, the elongated body defining a grip portion disposed between the first end and the second end, the grip portion having a width that is less than the length of the elongated body, wherein the width is measured in a direction perpendicular to the length; and a head disposed on the first end of the handle such that the handle and the head are formed as a single unified body, the head having a width that is greater than the width of the handle, the head supporting a pliable core formed of a material that is more pliable than the handle and the head;

a first fabric layer surrounding the head, the first fabric layer form-fitted to the head to limit shifting of the first fabric layer relative to the head; and a second fabric layer overlaying the first fabric layer, the second fabric layer being a non-cotton textile, wherein the second fabric layer is coupled to the handle along a seam extending continuously around a perimeter of the handle and defining a smooth transition between the second fabric layer and the handle to minimize abrasion to a person's face, wherein the head is rounded such that the head has only smooth surfaces and rounded edges at the first end to shape the first fabric layer and the second fabric layer to apply a product to the person's face.

2. The cosmetic swab of claim 1, wherein the pliable core is disposed under the first fabric layer.

3. The cosmetic swab of claim 2, wherein the pliable core is a foam core.

4. The cosmetic swab of claim 1, wherein the head is shaped as one selected from the group consisting of an oval, a cylinder, a paddle, and a cone.

5. The cosmetic swab of claim 1, further comprising a second head disposed on the second end of the handle, the second head having a width that is greater than the width of the handle.

6. The cosmetic swab of claim 1, wherein the second fabric layer is a microfiber.

7. The cosmetic swab of claim 1, wherein the second fabric layer is moisture wicking.

8. A cosmetic swab comprising:

a handle including an elongated body having a length extending between a first end and a second end, the elongated body defining a grip portion disposed between the first end and the second end, the grip portion having a width that is less than the length of the elongated body, wherein the width is measured in a direction perpendicular to the length; and a head disposed on the first end of the handle such that the handle and the head are formed as a single unitary body, the head having a width that is greater than the width of the handle, the head supporting a pliable core formed of a material that is more pliable than the handle and the head, and a fabric layer surrounding the head and the pliable core, the fabric layer being a non-cotton textile, wherein the pliable core shapes the fabric layer and the fabric layer is form-fitted to the head to limit shifting of the fabric layer relative to the head, wherein the head including the pliable core is rounded such that the head has only smooth surfaces and rounded edges at the first end to shape the fabric layer to apply a product to the person's face.

9. The cosmetic swab of claim 8, wherein the pliable core is a foam core.

10. The cosmetic swab of claim 8, wherein the head is shaped as one selected from the group consisting of an oval, a cylinder, a paddle, and a cone.

11. The cosmetic swab of claim 8, wherein the fabric layer is a microfiber.

12. The cosmetic swab of claim 8, wherein the fabric layer is coupled to the handle along a seam extending continuously around the perimeter of the handle, and wherein the seam creates a smooth transition between the fabric layer and the handle.

13. The cosmetic swab of claim 8, wherein the fabric layer is moisture wicking.

14. A method of manufacturing a cosmetic swab, the method comprising:

providing a handle including an elongated body having a length extending between a first end and a second end, the elongated body defining a grip portion disposed between the first end and the second end, the grip portion having a width that is less than the length of the elongated body, wherein the width is measured in a direction perpendicular to the length;

forming a head on the first end of the handle such that the handle and the head are formed as a single unified body, the head having a width that is greater than the width of the handle, the head being formed of a material that is more pliable than the handle, the head supporting a pliable core formed of a material that is more pliable than the handle and the head;

wrapping the head with a first fabric layer, the first fabric layer form-fitted to the head to limit shifting of the first fabric layer relative to the head;

overlaying the first fabric layer with a second fabric layer, the second fabric layer being a non-cotton textile; and coupling the second fabric layer to the handle along a seam extending continuously around the perimeter of handle, the seam creating a smooth transition between the second fabric layer and the handle to minimize abrasion to a person's face, wherein the head is rounded such that the head has only smooth surfaces and rounded edges at the first end to shape the first fabric layer and the second fabric layer to apply a product to the person's face.

15. The method of claim 14, wherein overlaying the first fabric layer with a second fabric layer includes overlaying the first fabric layer with a microfiber.

16. The method of claim 14, wherein forming the head includes forming the head with a pliable core composed of a material that is more pliable than the handle.

17. The cosmetic swab of claim 1, wherein the head is flat-rounded.

18. The cosmetic swab of claim 1, wherein the head complements the shape of the first fabric layer and the second fabric layer to limit shifting of the first fabric layer and the second fabric layer relative to the head.

* * * * *